May 29, 1956  F. URBACH  2,748,289
ULTRAVIOLET PHOTOMETER
Filed July 7, 1952
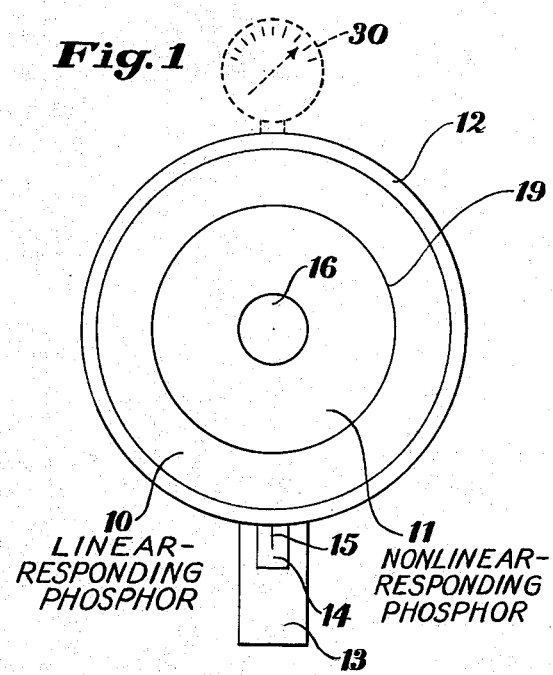
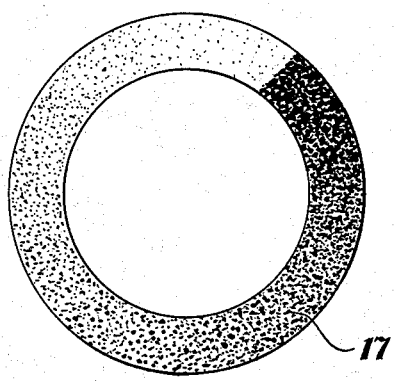
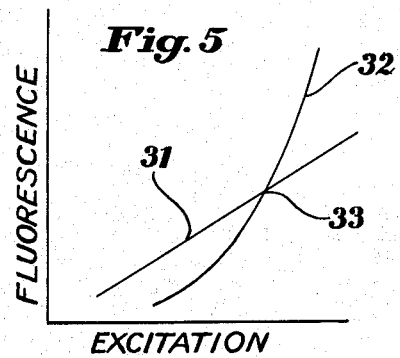
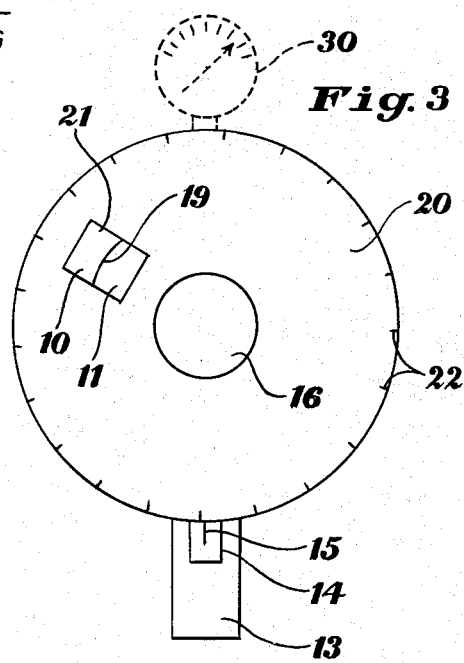
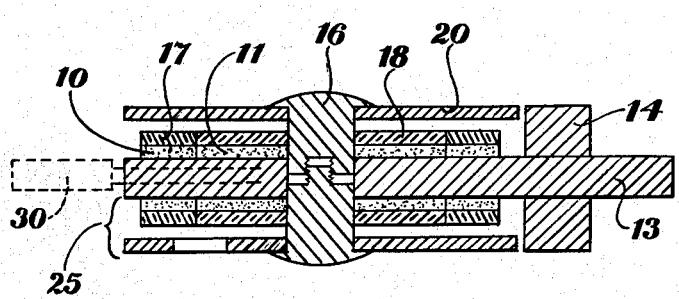
Franz Urbach
INVENTOR.
ATTORNEYS

United States Patent Office

2,748,289
Patented May 29, 1956

2,748,289

ULTRAVIOLET PHOTOMETER

Franz Urbach, Rochester, N. Y., assignor to Eastman Kodak Company, Rochester, N. Y., a corporation of New Jersey Application July 7, 1952, Serial No. 297,449

11 Claims. (Cl. 250—79)

This invention relates to an instrument for measuring a fluorescigenous radiation such as ultraviolet light.

In certain processes employing fluorescent light it is desirable to know the intensity of the activating or fluorescigenous radiation, and the primary object of the present invention is to provide a simple meter for making such determinations. The invention is also applicable to measuring the intensity of visible light, say blue light which with certain phosphors causes orange or red fluorescence. The photometer is also useful for ordinary outdoor photography since the actinic intensity of any scene is usually proportional to the violet or ultraviolet intensity and hence measurements of the latter by the present instrument may be used directly in the determination of proper exposure.

No matter which of these uses is selected, the outstanding advantage and object of the present invention is the simple construction of the photometer requiring neither a photoelectric cell nor any electric lamp or other comparison standard. Nevertheless, the instrument provides substantially the same accuracy as a comparison photometer.

As pointed out in my U. S. Patent 2,551,650, certain phosphors vary in brightness as the temperature is changed providing the exciting intensity remains constant. Contrarywise, these phosphors vary non-linearly with the exciting intensity providing the temperature is kept constant. It is this latter property which is employed in the present invention. The invention is not limited to any particular phosphor materials but does employ two somewhat different phosphors, one of which usually has a linear or substantially linear response and the other of which has a non-linear response. That is, the latter phosphor has a fluorescent intensity which changes non-linearly with changes in intensity of the ultraviolet or fluorescigenous radiation. More generally speaking, the invention involves the comparison of two phosphors whose response functions are different; it is not essential that one of the responses be linear.

According to the invention a photometer for measuring the intensity of fluorescigenous radiation is made of juxtaposed patches of phosphors of substantially identical fluorescent hues, the two phosphors having different response functions and matching in brightness at any one point of the dividing line between them at only one level of fluorescigenous intensity. One simple and convenient method of obtaining substantially identical fluorescent hues is to use two phosphors which are identical in composition, except for the presence of one ingredient, a so-called "poison," in only one of them. Of such pairs, the phosphor containing the poison shows sharp non-linearity, while the poison-free phosphor has much more nearly linear response. Since the non-linear response is usually associated with lower efficiency, i. e., lower fluorescence, it is convenient to place a neutral optical density over the "linear-responding" patch. In order to make the photometer useful over a range of intensities, the neutral density is preferably wedged parallel to the dividing line between the patches so that different fluorescigenous intensities cause the patches to match at different points along the dividing line. The optical density wedge may be made up photographically. A corresponding filter having a uniform density, usually very low is placed over the non-linear patch of phosphor so as to compensate for any effects of the film base or gelatin absorption or surface reflection inherent in the optical density wedge so that the only difference as far as the covering layers are concerned is the fact that the one over the linear responding phosphor has a wedged optical density.

The effect of the optical density is in general two-fold in that it reduces the intensity of the fluorescigenous radiation before it reaches the phosphor and it reduces the fluorescent intensity emitted by the excited phosphor. The term optical density wedge, as usual, covers either or both of these functions.

It is also convenient to provide a scale associated with the wedge to indicate the fluorescigenous intensity corresponding to a brightness match at each point along the dividing line. For physiological reasons it is preferable to confine the field of view to the particular areas of the phosphors which are being matched. Accordingly, an opaque mask is provided with an aperture or window at one point of the dividing line between the patches and movable along the dividing line. Conveniently, the phosphor patches may be made up circular in form with a circular dividing line and the apertured mask is then rotatably mounted so that the window moves along the dividing line.

In those cases in which the highest precision is not desired and in which the room temperature stays more or less constant, such as indoor photography, it is usually not necessary to take any special precaution to ensure proper temperature of the phosphor patches. On the other hand, it is preferable to make the readings with the phosphors at a uniform temperature and to correct the reading if the temperature varies appreciably from the standard at which the instrument is first calibrated. To ensure uniform temperature particularly across the non-linear-responding phosphor, which is the most temperature-sensitive one, it is preferable to mount the phosphors on a highly heat conducting base such as metal. A thermometer may be included to indicate the temperature of the metal support.

If it is desirable to have a photometer which covers a greater range of fluorescigenous intensities than is obtainable from one particular pair of phosphor patches and one optical wedge, a photometer according to my invention may be made up in duplex form with one of a pair of patches covering one range of intensities on one side of the instrument and a second pair of phosphor patches covering a different range of intensities on the other side of the instrument.

The invention will be fully understood from the following description of a preferred embodiment thereof when read in connection with the accompanying drawing in which:

Fig. 1 is a plan view of the essential part of a photometer according to the present invention.

Fig. 2 illustrates an optical density wedge to be mounted immediately over the part of the instrument shown in Fig. 1.

Fig. 3 is a plan view of the instrument with the cover plate on.

Fig. 4 is a cross section of the arrangement shown in Figs. 1, 2, and 3.

Fig. 5 is a graph to illustrate the principle of the invention.

In Fig. 1 two fluorescent phosphor patches 10 and 11 are mounted on a metal disk 12 with the dividing line 19 between the patches circular in form. The phosphor 10 is a linear responding one such as zinc cadmium sulfide activated by 400 parts per 1,000,000 by weight of silver but containing substantially no nickel. The phosphor patch 11 is a non-linear responding phosphor which is also zinc cadmium sulfide activated by 400 parts per 1,000,000 by weight of silver but containing in addition 1 part by weight per 1,000,000 of nickel. The nickel tends to poison the phosphor so that the fluorescence is reduced, but the important point is that the response is changed from a substantially linear one to a non-linear one. That is, over a considerable range, doubling the intensity of the exciting radiation more than doubles the fluorescence of the patch 11.

The optical density wedge shown in Fig. 2 is mounted immediately in front of the phospor patch 10, the wedging being parallel to the dividing line 19.

As shown in Fig. 3 an opaque mask 20 is mounted over the patches and wedge with an aperture or window 21 for viewing one point on the dividing line 19. Small areas of the phosphors 10 and 11 are seen through the window 19. The whole instrument is carried by a handle 13 rigidly part of the supporting disk 12. Attached to the handle and extending upward therefrom is a part 14 carrying an index mark 15 which is read against a scale 22 carried on the circumference of the mask 21 which is rotatable about the central clamping post 16 which holds the various parts of the instrument together.

The two phosphors match at only one intensity of fluorescigenous radiation or more exactly they match at one point of the dividing line for only one such intensity but for different intensities they match at different points of the dividing line due to the effect of the wedge 17. In using the photometer, the front cover or mask 20 is rotated until the window 21 is in front of the point of the dividing line 19 at which the patches 10 and 11 match. Actually the patch 11 appears uniformly bright and the patch 10 appears slightly wedged in brightness as seen through the window 21 and the window is moved until the patch 10 is brighter than the patch 11 at one side of the window and less bright at the other side of the window. The scale 22 as read at index 15 then indicates the intensity of the fluorescigenous radiation.

Since all precise measurements require the readings to be taken at a standard temperature or require any differences from this temperature to be taken into account, the supporting disk 12 for certain embodiments is provided with a hole into which a thermometer 30 is fitted to indicate the temperature of the phosphor at the time the photometer reading is taken.

As shown in Fig. 4 the instrument preferably includes a fixed, uniform, substantially zero density, filter 18 over the non-linear responding phosphor patch 11 to compensate for any inherent effects of the wedge 17 other than the desired density wedge effect itself. Also, as shown in Fig. 4, this particular embodiment has two complete and independent photometers on opposite sides thereof. That is, the lower section 25 is a duplicate of the above-discussed upper section except that the phosphors and wedge are changed so that the photometer covers a different range of fluorescigenous intensities. In Fig. 5 the straight line 31 represents the response of a normal linear responding phosphor. That is, the fluorescence emitted by the phosphor is directly proportional to the excitation over the range shown. On the other hand, the curve 32 represents a non-linear responding phosphor in which the fluorescence intensity varies non-linearly with the excitation intensity. For low values of excitation the linear phosphor (31) has a fluorescent brightness greater than the phosphor corresponding to curve 32 but at higher intensities of excitation the reverse is true and at only one level of excitation, as indicated by the point 33, the fluorescent brightnesses match. The optical wedge in front of the linear responding phosphor means that each point of this phosphor has a different curve 31, the family of curves being parallel straight lines when the ordinates are logarithmic, or lines diverging from the origin when the ordinates are linear. Thus the point 33 appears at different points along the curve 32 for different areas of the phosphor 10 as combined with the wedge 17. The present invention is not limited to non-linear responding phosphors which are super linear as illustrated in Fig. 5. Nor is it limited to having one of the phosphors substantially linear in its response since both phosphors could be non-linear provided their characteristic curves corresponding to Fig. 5 cross only at one point. Since it is difficult to match visually the brightnesses of two areas having different hues, it is necessary to have phosphors of substantially the same fluorescent hue and this may conveniently be obtained by using the same phosphor for both patches except that the nonlinear one is poisoned, for example, by nickel.

The invention is not limited to this specific embodiment but is of the scope of the appended claims.

I claim:

1. A photometer for measuring the intensity of fluorescigenous radiation comprising juxtaposed patches of phosphors of substantially identical fluorescent hues, one of the phosphors being a normal approximately linear-responding phosphor and the other being a non-linear-responding phosphor, the two phosphors matching in brightness at any one point of the dividing line between them at only one level of fluorescigenous intensity, and highly heat-conducting support means for the patches to maintain substantially uniform temperature across the non-linear-responding phosphor.

2. A photometer according to claim 1 in which the phosphors are substantially identical materials except that the non-linear one contains a fluorescence poison.

3. A photometer according to claim 1 including an optical density wedge immediately in front of one of the patches with the wedging parallel to the dividing line.

4. A photometer for measuring the intensity of fluorescigenous radiation comprising juxtaposed patches of phosphors of substantially identical fluorescent hues, one of the phosphors being a normal approximately linear-responding phosphor and the other being a non-linear-responding phosphor and an optical density wedge immediately in front of the linear-responding phosphor wedged parallel to the dividing line between the patches, the two phosphors matching in brightness at each point of the dividing line at only one level of fluorescigenous intensity, and highly heat-conducting support means for the patches to maintain substantially uniform temperature across the non-linear-responding phosphor.

5. A photometer according to claim 4 in which the phosphors are substantially identical materials except that the non-linear one contains a fluorescence poison.

6. A photometer according to claim 4 in which a layer substantially identical to the density wedge except that it has uniform density is immediately in front of the non-linear-responding phosphor.

7. A photometer according to claim 4 including a scale associated with said wedge to indicate the fluorescigenous intensity corresponding to matching brightnesses at each point of the dividing line.

8. A photometer for measuring the intensity of ultra-violet light comprising two concentric juxtaposed patches of phosphors of substantially identical fluorescent hues, the dividing line between the patches being substantially circular, one of the phosphors being a normal approximately linear-responding phosphor and the other being a non-linear-responding phosphor, highly heat conducting means supporting the patches to maintain the non-linear-responding phosphor at substantially uniform temperature, and an optical density wedge immediately in front of the linear-responding phosphor circularly wedged along the dividing line, the two phosphors matching in brightness at each point of the dividing line at only one level of fluorescigenous intensity.

9. A photometer according to claim 8 including a mask rotatably mounted in front of the patches with an observation window movable along the dividing line for masking off all of the patches except the areas being compared and a scale and index for indicating the relative orientation of the mask and patches when the areas under the window match in brightness.

10. A photometer for measuring the intensity of fluorescigenous radiation comprising juxtaposed patches of phosphors of substantially identical fluorescent hues but different characteristic intensity response functions and an optical density wedge immediately in front of one of the phosphors wedged parallel to the dividing line between the patches, the two phosphors matching in brightness at each point of the dividing line at only one level of fluorescigenous intensity.

11. A photometer for measuring the intensity of fluorescigenous radiation comprising juxtaposed patches of phosphors of substantially identical fluorescent hues but different characteristic intensity response functions, the two phosphors matching in brightness at any one point of the dividing line between them at only one level of fluorescigenous intensity, and highly heat-conducting support means for the patches to maintain substantially uniform temperature across the phosphors, and highly heat-conducting support means for the patches to maintain substantially unform temperature across the non-linear-responding phosphor.

References Cited in the file of this patent

UNITED STATES PATENTS

| | | |
|---|---|---|
| 1,990,022 | Du Mond et al. | Feb. 5, 1935 |
| 2,286,779 | Yule | June 16, 1942 |
| 2,482,813 | Urbach | Sept. 27, 1949 |
| 2,551,650 | Urbach | May 8, 1951 |

OTHER REFERENCES

"Photoluminescence of Some Sulfide Phosphors as a Function of Intensity," Nail et al. Solid Luminescent Materials, Cornell Symposium, publ. by John Wiley & Sons, Inc., New York, N. Y., 1948 pp. 190–201. (Copy in Div. 54.)